United States Patent [19]
Bengtson

[11] Patent Number: 5,946,936
[45] Date of Patent: Sep. 7, 1999

[54] HEATABLE INSULATED CONTAINER

[76] Inventor: Daniel Emilio Bengtson, Estanislao Diaz 455, San Isidro PCIA. de Buenos Aires, Argentina

[21] Appl. No.: 08/941,733

[22] Filed: Oct. 1, 1997

[30] Foreign Application Priority Data

May 23, 1997 [AR] Argentina ................. P97 01 02194

[51] Int. Cl.[6] ..................................................... F25D 3/08
[52] U.S. Cl. ..................... 62/457.2; 62/457.4; 62/457.5; 62/457.8
[58] Field of Search ............................. 62/457.4, 457.5, 62/457.8, 457.2

[56] References Cited

U.S. PATENT DOCUMENTS

| | | |
|---|---|---|
| 2,632,576 | 3/1953 | Hassid et al. . |
| 2,828,043 | 3/1958 | Hosford, Jr. . |
| 3,331,522 | 7/1967 | Bridges . |
| 3,513,531 | 5/1970 | Humphress et al. . |
| 3,910,441 | 10/1975 | Bramming . |
| 4,196,721 | 4/1980 | Posnansky . |
| 4,200,199 | 4/1980 | Perkins et al. . |
| 4,351,451 | 9/1982 | Chung . |
| 4,446,978 | 5/1984 | Arndt et al. . |
| 4,595,437 | 6/1986 | Yamamoto . |
| 4,675,508 | 6/1987 | Miyaji et al. . |
| 4,754,888 | 7/1988 | Letsch et al. . |
| 5,168,793 | 12/1992 | Padamsee . |

*Primary Examiner*—Henry Bennett
*Assistant Examiner*—Mark Shulman
*Attorney, Agent, or Firm*—Robert E. Bushnell, Esq.

[57] ABSTRACT

A heatable insulated container specially suited for storing beverages and maintaining them cold or hot, behaves as a thermal container, maintaining the interior temperature for prolonged periods of time and at the same time has the advantage that it can be placed over an external hot plate or heat source to reheat its contents. The body of the container is defined by two lateral walls, separated by a vacuum and a heat resistant lower base which, in addition has a high thermal conductivity. The container includes a removable support base having thermal insulation, which is removable to allow fast reheating of the contents of the container without having to extract the contents from the container.

20 Claims, 3 Drawing Sheets

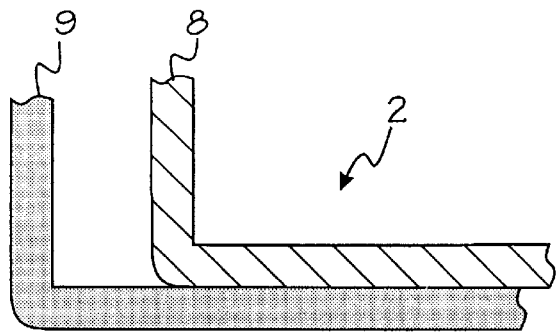
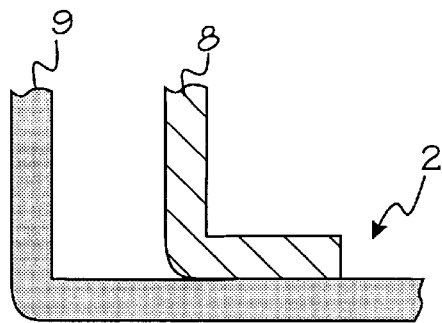
Fig. 3        Fig. 4
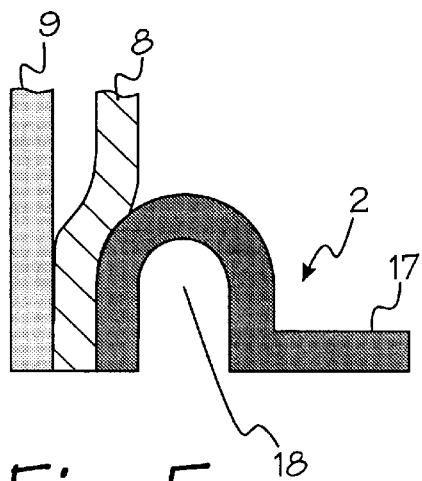
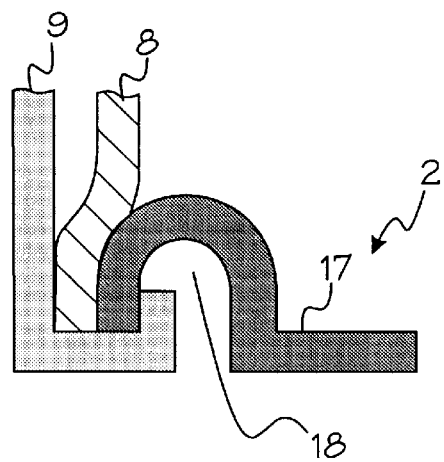
Fig. 5        Fig. 6
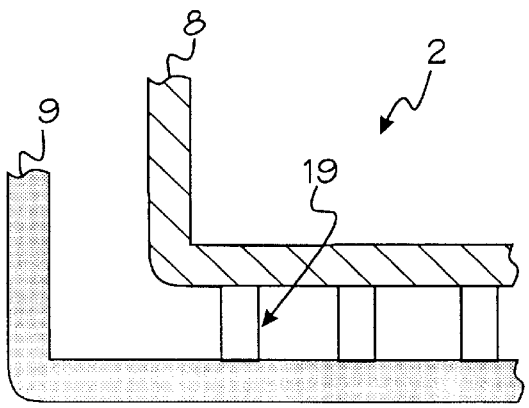
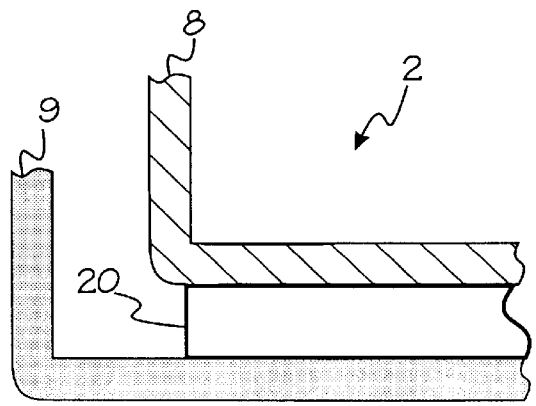
Fig. 7        Fig. 8

HEATABLE INSULATED CONTAINER

CLAIM OF PRIORITY

This application makes reference to, incorporates the same herein, and claims all benefits accruing under 35 U.S.C. §119 from an application entitled Easily Heatable Container with Thermal Insulation earlier filed in the Patent Office of Argentina on the 23$^{rd}$ of May 1997, and there duly assigned Ser. No. P97 01 02194 by that Office.

BACKGROUND OF THE INVENTION

1. Field of the Invention

The present invention is related to a beatable insulated container for containing cold or hot beverages, which presents a series of functional advantages when compared to all the other known containers of its kind.

More particularly, the present invention relates to a particular container, specially usable as a container for hot beverages since it possesses means to maintain the interior temperature constant during prolonged periods of time, combined with the capability of heating the contents with an external heat source without having to extract the contents from the inside of the container.

Thus, the present invention is related to a heatable insulated container that has the properties of insulated containers that conserve heat, usually called a "thermos" or vacuum bottle, but, in addition, allows the contents of the container to be reheated without being removed from the container, a characteristic impossible with earlier vacuum bottles.

2. Description of the Related Art

As is known, the resulting habitual use of vacuum bottles is for conserving hot water which will be used on trips, in offices, or in the home, for the preparation of infusions of coffee, tea, or the like, and also in soups, or including milk. These containers fully satisfy the need of many people who count on hot water being permanently available and for that reason they are accepted worldwide and used extensively. However, they have the inconvenience that, given its constructive characteristics, they do not allow the reheating of the contents; that is they force the user to extract the contents from the vacuum bottle, use a container appropriate for doing said heating with an external heat source and later putting the contents back in the vacuum bottle.

Other containers known for the heating of liquids, such as kettles, coffee makers, milk jugs, etc., are suitable for reheating the contents, but they do not act as vacuum bottles since they allow the heat to dissipate very quickly.

The patent to Miyaji et al U.S. Pat. No. 4,675,508, entitled Electrically Heated Vacuum Bottle, discloses a vacuum bottle which includes an electric heater disposed within the confines of the inner shell of the vacuum bottle. The use of an electric heater disposed within the vacuum bottle creates a very expensive structure which can not easily be repaired.

The patent to Padamsee, U.S. Pat. No. 5,168,793, entitled Vacuum Vessel with Heat Input Portal and Beverage Brewing System Used Therewith, discloses a vacuum bottle containing a heat input portal for transferring heat to the contents of the bottle solely by means of thermal radiation.

Note that the patent to Padamsee specifically makes the portal easily transmit heat by radiation but remain an insulator with respect to heat transmission via conduction.

The following additional patents each disclose features in common with the present invention but do not teach or suggest a heatable insulated container according to the present invention: Posmansky, U.S. Pat. No. 4,196,721, entitled Solar Heated Vacuum Flask, Letsch et al., U.S. Pat. No. 4,754,888, entitled Vacuum Carafe; Chung, U.S. Pat. No. 4,351,451, entitled Rubber Sealed Metal Vacuum Bottle and Stopper Caps Therefor; Arndt et al., U.S. Pat. No. 4,446,978, entitled Insulated Container; Yamamoto, U.S. Pat. No. 4,595,437, entitled Method of Producing a Warmth Keeping Vessel Made of Ceramics or Porcelain; Perkins et al, U.S. Pat. No. 4,200,199, entitled Vacuum Bottle Construction; Bramming, U.S. Pat. No. 3,910,441, entitled Vacuum Insulated Bottle; Humphress et al., U.S. Pat. No. 3,513,531, entitled Method of Making Vacuum Containers; Bridges, U.S. Pat. No. 3,331,522, entitled Metal Vacuum Bottle with Plastic Jacket; Hosford, Jr., U.S. Pat. No. 2,828,043, entitled Vacuum Container; Hassid et al., U.S. Pat. No. 2,632,576, entitled, Vacuum Flask; Bridges, U.S. Pat. No. 3,845,873, entitled Vacuum Insulated Container; Potter, Jr., U.S. Pat. No. 3,961,720, entitled Vacuum Insulated Container; McGough, U.S. Pat. No. 4,293,015, entitled Insulated Beverage Cozy; Pewitt, U.S. Pat. No. 4,616,758, entitled Insulated Coaster for Glasses, Cans, Bottles, or the Like; Zimmerman, U.S. Pat. No. 4,616,758, entitled Insulating Container, in Particular Insulating Bottle; Yeh, U.S. Pat. No. 5,353,926, entitled Mug and Coaster Assembly; Bufalini, U.S. Pat. No. 3,089,317, entitled Heat Exchanging Attachment for Receptacles; Byrns, U.S. Pat. No. 4,708,254, entitled Insulated Bottle Holder; Abbey, U.S. Pat. No. 3,633,863, Coaster Arrangement; Kelly, Jr., U.S. Pat. No. 4,344,303, entitled Beverage Container Cooler; Larson, U.S. Pat. No. 4,462,444, entitled Insulating Jacket for a Beverage Container; Scheurer, U.S. Pat. No. 4,510,665, entitled Container Insulation Apparatus.

SUMMARY OF THE INVENTION

The heatable insulated container to which the present invention relates to, and is distinguishable from the cited earlier containers because, while having the capability of conserving heat in its interior, it also allows the reheating of the contents it stores, without it being necessary to extract the contents to effect reheating.

The indicated advantage appears to be totally new since, there are no known containers that possess the functional characteristics which have been indicated. To be able to do this, the heatable insulated container of this invention has a design which consists of, for example, a cylindrical shaped body portion having by preference in its upper section, a narrowing, where a neck having an opening therein is defined for the location of a stopper, with the particularity that, the body and the neck comprise a double wall structure, separated so as to form a hermetic space that maintains a vacuum therebetweem This means that it has an insulating thermal structure with a very low heat dissipation; in its part, its lower closed base has the capability to be exposed to an external heat source and to conductively transmit the heat to the contents inside; that is to say, it has a high thermal conductivity.

The walls of the container, may be metallic, preferably stainless steel so that its thickness and mutual separation in the sections of the double wall vary in accordance with the size and the function to which it will be used.

It is clear from what has been available until now that, the novel conditions of usage that the insulated container of the present invention contributes, comprises a new range of applications that were impossible to achieve with earlier vacuum bottles and with conventional containers. Now the user can count on a container where water, milk, coffee, etc., can be heated using a stove, for example, knowing that the heated contents will be maintained in this heated condition for a long period of time. This is very useful in offices, being that the coffee which is prepared in the early morning hours, will be able to be consumed during the day without needing to successively reheat it, for example, it being a well known fact that coffee that has been reheated several times loses its aroma and flavor and becomes bitter.

The user can also count on a container that can cool and keep cold the liquid contents that it stores (such as juice, milk, water, etc.). It is enough to place the container on the floor of a refrigerator or freezer for the liquid inside to be cooled by thermal conduction through the base thereof.

In order for it to function much more efficiently and to prevent the heated or cooled contained liquid from transferring heat by conduction through the base of the container, the invention includes a detachable insulated support jacket capable of receiving the lower portion of the container, retaining it, and reducing the loss of heat by conduction. The support is a removable jacket, which is made of an insulating material that comprises a seating base enclosed by a vertical wall that is disposed over the exterior lateral walls of the container, thereby reducing the heat transfer by conduction that is produced from the base and the internal sections of the lateral walls, thus avoiding heat transfer by conduction to the outside of the container.

To highlight the advantages briefly commented on, to which the users could add many more, and to facilitate the comprehension of the constructive, constitutive, and functional characteristics of the heatable insulated container of the present invention, a discussion of a preferred embodiment of the present invention follows; which is illustrated schematically, and without a determined scale with the expressed clarification that, precisely, for dealing with an example, it does not correspond to assigning a Limiting or exclusive character to the scope of protection of the present invention. Rather, it is merely explicative or illustrative of the basic concept of this invention.

BRIEF DESCRIPTION OF THE DRAWINGS

FIGS. 3 to 6 are amplified details in cross-section that show different constructive solutions for joining the base with the lateral walls of the container.

FIGS. 7 and 8 are amplified details that show different constructive solutions to the base of the container that favor its condition of permitting the transmission of heat by said zone.

It is understood that, in all the figures, the same reference number correspond the same or equivalent constitutive parts or elements of the whole, according to the chosen example for the present explanation of the container.

DESCRIPTION OF THE PREFERRED EMBODIMENT

Figure 1:
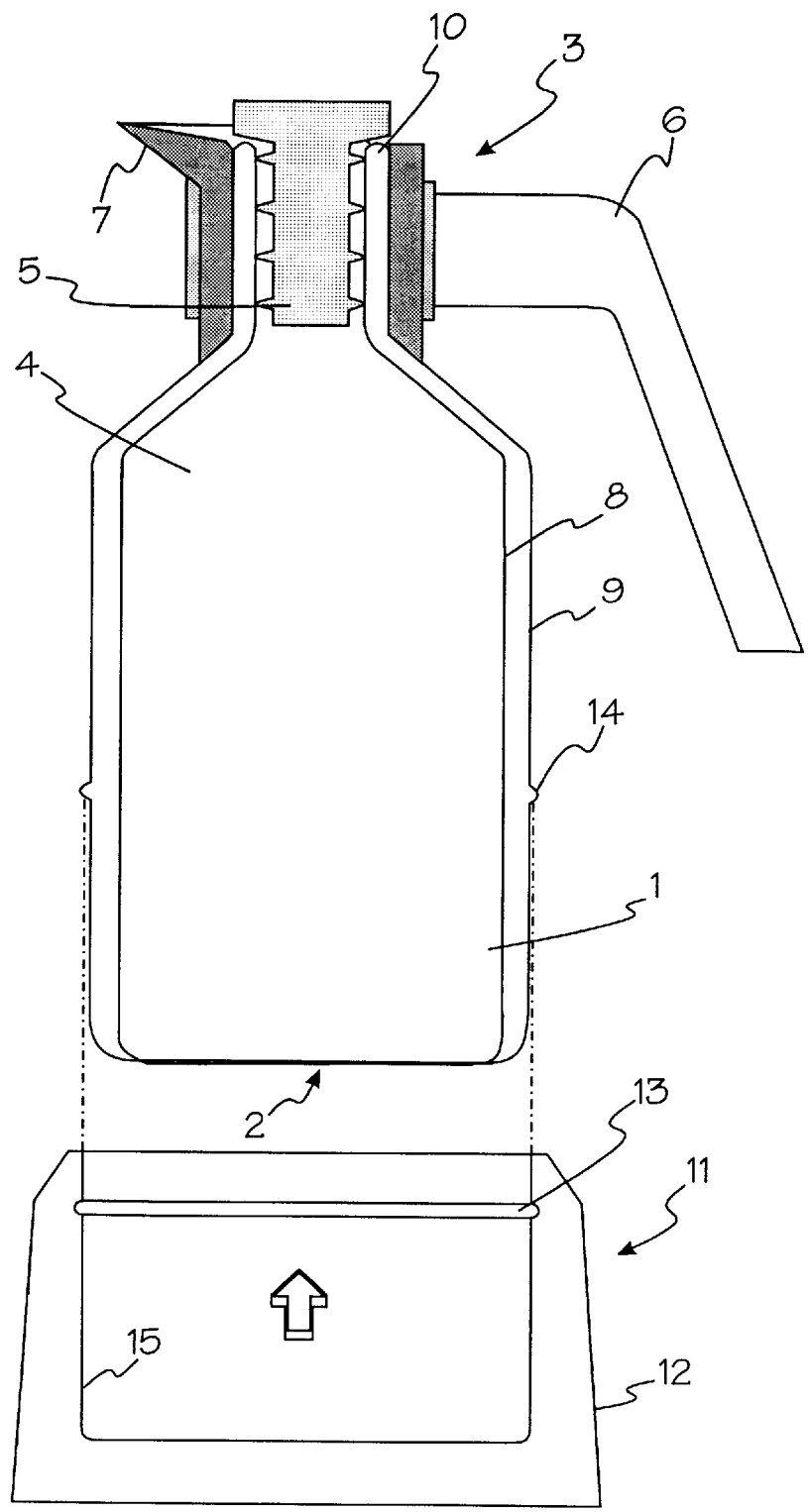
FIG. 1, is a partially exploded view with a vertical cross-section that represents a thermal container in accordance with the present invention, with its removable insulating support.

As can be appreciated in FIG. 1, the heatable insulated container to which the present invention relates to consists of a cylindrical main body 1, with a base 2, a neck 3 defined by a conical section 4 that is a progressive narrowing of the main body. A stopper 5 is removably contained in the neck 3. Also, a handle 6 and a pouring spout 7 may be disposed by the neck 3.

The accessory forms, designs, size and elements indicated may vary depending on the purpose of the container. The body is defined by two lateral walls 8 and 9 separated by an internal space therebetween containing a partial vacuum. They extend from the base 2 to the opening in the neck 3 consisting of a narrow passage 10 and constitute an insulating thermal barrier of the interior space of the container. The related condition of double walls 8 and 9 is functionally combined with the base 2 that is metallic and transfers heat due by conduction to the direct action of an external heat source such as a hot plate or burner of a stove.

The invention includes an insulated removable support jacket 11 in which the container fits exactly. It is preferably constituted of a lightweight, heat insulating material and provides a means of support for the container as well as reducing the transfer of heat by conduction through the base 2, or through the lower portion of the walls of the container.

FIG. 1 shows the support jacket 11, separated from the container and including a cavity for storing the lower section of the container. For that reason it has a lateral wall 12 that extends a certain height to embrace and enclose the container, as is shown by the detail in FIG. 2.

The lateral wall 12 of the support jacket 11, can include retention means that permit its easy and manual removal when the user wishes to heat or cool the liquid contents stored in the container. In the illustrated case, this means consists of a ring shaped channel 13 disposed at a height equivalent to the location of the corresponding ridge 14 preferably disposed over the external surface of the wall 9.

As was previously indicated, the objective of this insulating support jacket 11 is to provide the necessary insulation to the lower section of the container, counteracting the high thermal conductivity that the base 2 possesses. In this way, it can be assured that the internal temperature of the container will be kept relatively stable. For that, the body of this support should have insulation and at the same time, be resistant to heat when it makes contact with a hot base or wall In this sense, it will be preferable that the internal face 15 of the jacket support 11, be by preference, metallic, which will not be affected when the container is placed in the jacket support, immediately after being removed from the external heat source.

In the example shown in FIG. 1, the support jacket 11 is constituted by an insulating means that can be, for example, polystyrene foam, reconstituted cork, a plastic material with fiberglass in its interior, etc.

Figure 2:
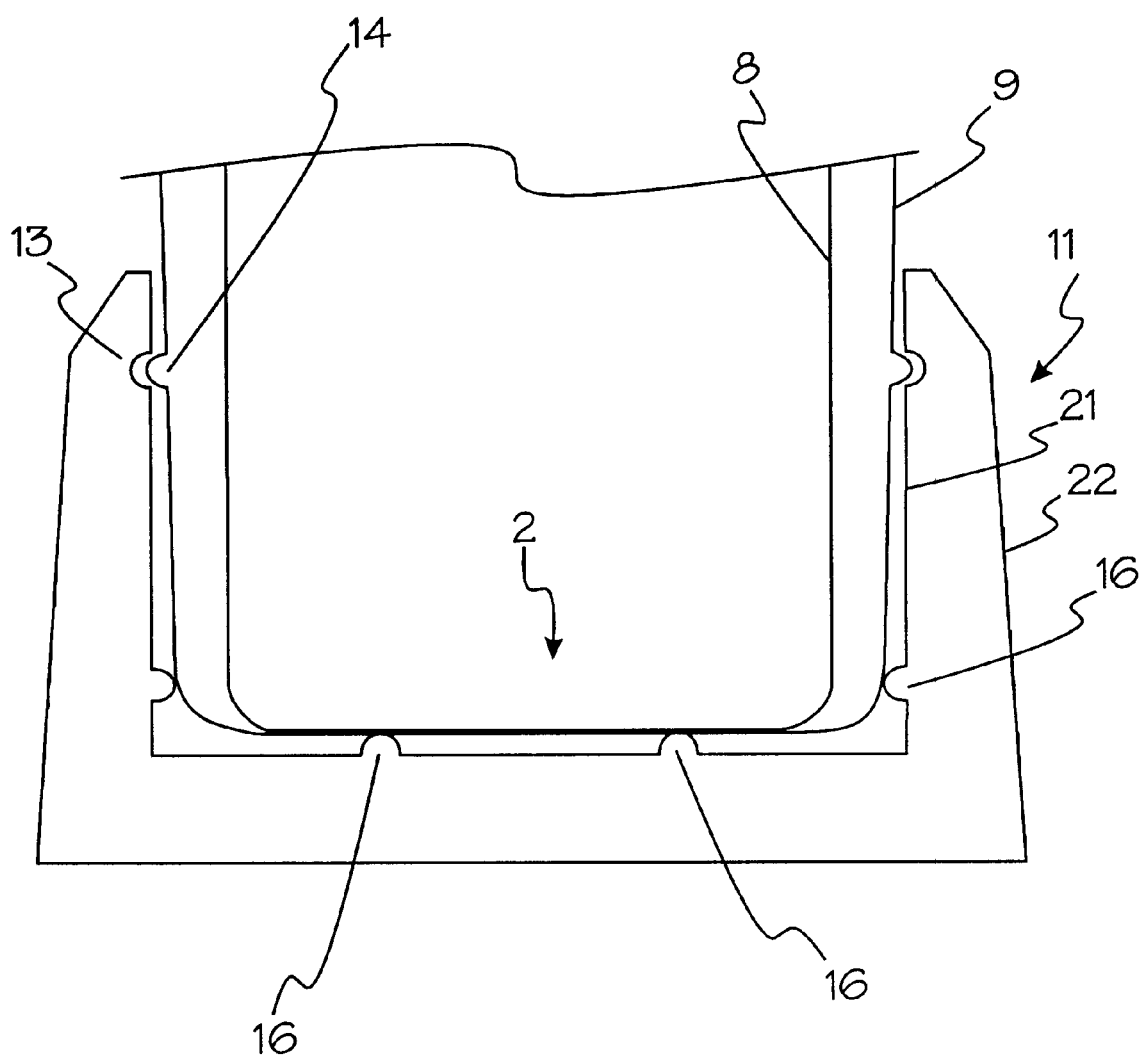
FIG. 2, is a partial vertical cross-section of the container of FIG. 1, with the inclusion of the insulating support in its place of use.

Specifically in the case of FIG. 2, to give another example, the insulating support 11 is of a metallic double wall construction consists of walls 21 and 22, with a vacuum therebetween.

The invention contemplates projecting teeth 16 for reducing the thermal conductivity that is produced when two surfaces make contact.

It is left clear that, taking into consideration the enormous quantity of existing materials with insulation properties, applicable in this realization, the detailed examples are only to the effect of facilitating comprehension of the function of the invented container, and not limiting itself to the cited materials.

With FIG. 3 and the following figures, constructive options are represented for the meeting of the base 2 with the lateral walls 8 and 9 of the container, making sure, above all, that said base allows the introduction and extraction of heat by conduction from the interior of the container.

In FIG. 3, the related walls 8 and 9 are superimposed and welded to form the base 2.

In FIG. 4, the external wall 9 is continuous and defines the body of the base; the internal wall 8 is superimposed and welded in a short section of the same base.

FIGS. 5 and 6, show the cases in which for the formation of the base, the lateral walls 8 and 9 do not cover the base. In these cases, a plate 17 is used to connect to those walls so as to cover the base, with the inclusion of pleated means, and welded so as to include a curved section 18 that is provided to absorb expansions or contractions of the material exposed to the action of the heat source. According to FIG. 5 the attachment is by superimposing and welding while according to FIG. 6, one of the lateral walls embraces the peripheral border of the base, attached by overlapping, being able to resolve in the same manner starting from any of the other walls.

It clear that the constructive difference that exists between the base 2 of the container and its lateral walls, consists of the capacity of the base to allow the transmission by conduction of heat. In this sense the examples that are contained in FIGS. 7 and 8 contemplate the cases where thermal bridges are used, such as studs 19 illustrated in FIG. 7 or any other type of material 20 (solid, liquid, or gas) disposed between said walls 8 and 9, to allow the transmission by conduction of heat.

Another functional option that can be incorporated in this container, consists in the utilization of a temperature sensor associated with an indicator which indicates the internal temperature and is visible from outside the exterior of the container. This option is possible due to the presence of the related support 11, since the sensor can be located on the internal surface that makes contact with the base 2 of the container and by means of a thermal conductor feeds a plate indicating the internal temperature, the plate being located on an exterior surface of the support. In this manner, the user always knows the temperature of the liquid contents.

Although a preferred embodiment of the present invention has been disclosed for illustrative purposes, those skilled in the art will appreciate that various modifications, additions and substitutions are possible, without departing from the scope and spirit of the invention as disclosed in the accompanying claims. It is possible that other benefits or uses of the currently disclosed invention will become apparent over time.

What is claimed is:

1. A heatable insulated container comprising:

a body portion having an upper section containing an aperture therein and having a closed lower section and middle section;

a removable stopper disposed within said aperture;

a removable thermally insulated support jacket for enclosing at least said lower section of said body portion and for preventing the transfer of heat therethrough by conduction;

said middle and upper body portions comprised of a thermally insulated structure for preventing the transfer of heat therethrough by conduction;

said lower section comprising at least one transfer portion having a structure having a high heat conduction transfer characteristic;

wherein contents stored in the container are maintained at a relatively constant temperature when said lower section of said body is enclosed by said removable thermally insulated support; and wherein an external heat or cold source transfers heat solely by conduction through said transfer portion to or from the contents stored in the container in the absence of said removable thermally insulated support enclosing said lower section of said body.

2. The container of claim 1, said thermally insulated structure of said middle and upper body portions comprising a double wall structure, separated so as to form a hermetic space for maintaining a vacuum therebetween.

3. The container of claim 1, said thermally insulated support jacket comprising a double wall structure, separated so as to form a hermetic space for maintaining a vacuum therebetween.

4. The container of claim 1, said thermally insulated support jacket comprising a material selected from the group consisting of polystyrene foam, reconstituted cork, or a plastic material containing fiberglass.

5. The container of claim 4, said thermally insulated support jacket comprising a metallic layer where said jacket is in contact with said body portion.

6. The container in claim 1, said thermally insulated support jacket comprising a retaining means for retaining said support jacket to the container.

7. The container of claim 6, said retaining means comprising a ring shaped channel for engaging with a corresponding ridge in said lower section of said body.

8. The container in claim 2, said thermally insulated support jacket comprising a retaining means for retaining said support jacket to the container.

9. The container of claim 8, said retaining means comprising a ring shaped channel for engaging with a corresponding ridge in said lower section of said body.

10. The container in claim 3, said thermally insulated support jacket comprising a retaining means for retaining said support jacket to the container.

11. The container of claim 10, said retaining means comprising a ring shaped channel for engaging with a corresponding ridge in said lower section of said body.

12. The container in claim 4, said thermally insulated support jacket comprising a retaining means for retaining said support jacket to the container.

13. The container of claim 12, said retaining means comprising a ring shaped channel for engaging with a corresponding ridge in said lower section of said body.

14. The container in claim 5, said thermally insulated support jacket comprising a retaining means for retaining said support jacket to the container.

15. The container of claim 14, said retaining means comprising a ring shaped channel for engaging with a corresponding ridge in said lower section of said body.

16. The container of claim 1, said transfer portion comprising a plate.

17. The container of claim 1, said transfer portion comprising one of a plurality of thermal bridges, solid materials or fluids.

18. The container of claim 1, said thermally insulated support comprising a temperature sensor for measuring and indicating a temperature of the contents of the container.

19. The container of claim 1, said middle and lower sections of said body portion comprising a cylindrical shaped structure and said upper section of said body portion comprising a narrowing cylindrical neck portion transitioning between a diameter of said middle section of said body portion and said aperture.

20. The container of claim 1, said upper structure of said body portion comprising at least one of a handle and a spout.

* * * * *